Figure 1:
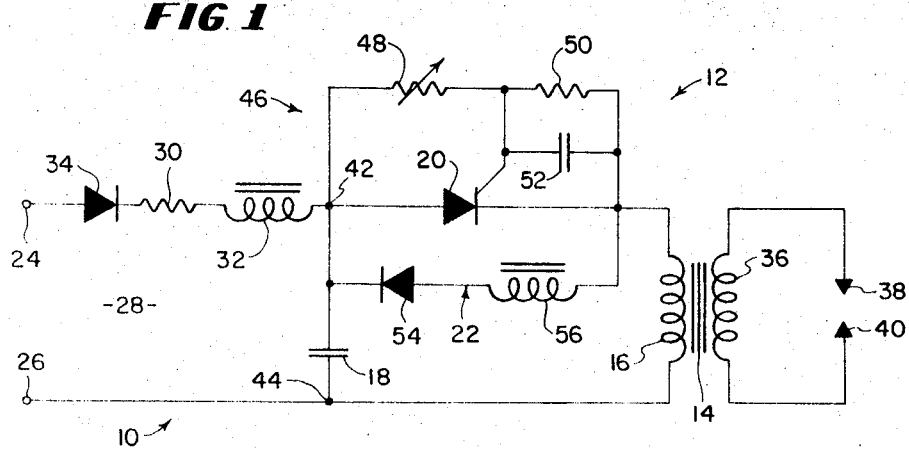

United States Patent [19]
Lourigan

[11] 3,849,670
[45] Nov. 19, 1974

[54] SCR COMMUTATION CIRCUIT FOR CURRENT PULSE GENERATORS

[75] Inventor: Ronald F. Lourigan, Kenosha, Wis.
[73] Assignee: Webster Electric Company, Inc., Racine, Wis.
[22] Filed: Apr. 13, 1973
[21] Appl. No.: 350,986

[52] U.S. Cl.................. 307/108, 317/96, 431/265, 323/DIG. 1
[51] Int. Cl. ............................................ H03k 3/00
[58] Field of Search........... 317/148.5 B, 86, 93, 96; 307/106, 107, 108, 246; 431/265, 66, 67, 68; 315/187, 199, 206, 209, 242, 243, 244, 289; 323/DIG. 1

[56] References Cited
UNITED STATES PATENTS
3,045,148  7/1962  McNulty et al..................... 315/206
3,556,706  1/1971  Campbell........................... 431/265

*Primary Examiner*—David Smith, Jr.
*Attorney, Agent, or Firm*—Mason, Kolehmainen, Rathburn & Wyss

[57] ABSTRACT

A current pulse generator includes a capacitor adapted to be charged from a power source. A circuit loop including the capacitor, a transformer primary winding and the output electrodes of an SCR is provided for discharge of the capacitor in a current pulse through the primary winding when the SCR is periodically rendered conductive by operation of a gating circuit connected to the control electrode of the SCR. A commutation circuit is provided for decreasing the turn-off time of the SCR in order to permit an increase in the frequency of current pulses. The commutation circuit includes a series-connected diode rectifier and inductance connected across the SCR output electrodes. The diode rectifier is poled oppositely to the SCR and permits reverse current to flow from the transformer primary winding to the capacitor following the capacitor discharge. The inductance applies a high initial reverse voltage to the SCR, and thereafter permits substantial reverse current flow for efficient recharging of the capacitor.

5 Claims, 2 Drawing Figures

3,849,670

PATENTED NOV 19 1974

SCR COMMUTATION CIRCUIT FOR CURRENT PULSE GENERATORS

The present invention relates to current pulse generator circuits of the type wherein a capacitor is discharged through an SCR into a transformer winding, and to a commutation circuit for turn-off of the SCR.

A widely used type of current pulse generator circuit includes a transformer wherein high voltage is induced in a secondary winding by means of a pulse of current passing through the primary winding. In a typical circuit of this type, a capacitor is charged from a power source and is periodically discharged through the primary winding by means of a switching device. A silicon controlled rectifier (SCR) is often used as a switching device. Circuits of this description are useful as spark ignition devices, high voltage D.C. power supplies and the like. One example of such a circuit may be found in U.S. Pat. No. 3,556,706 issued on Jan. 19, 1971 to R. H. Campbell.

It is often desirable to produce current pulses at a high frequency. As described in said U.S. Pat. No. 3,556,706, high frequency operation has important advantages in spark ignition systems for oil burner ignition. Similarly, in D.C. power supplies increased frequency of operation may be desirable in order to maintain high output voltages under various load conditions. In circuits known in the past, the frequency of operation has been limited by the operating characteristics of the SCR, and unduly expensive SCRs have been required. Even when expensive SCR's have been used they have proved unreliable.

More specifically, the turn-off time of an SCR is defined as the interval between the time when the forward annode current of the SCR reaches zero and the time when the SCR is able to block reapplied forward voltage. In a current pulse generator circuit, it is not possible to recharge the capacitor following discharge until the turn-off time has elapsed. Thus for stable high frequency operation, it has heretofore been necessary to make use of expensive SCRs having low turn-off times.

It is known that the turn-off time of an SCR can be reduced by subjecting the annode circuit of the SCR to a reverse voltage and reverse current. The forced turn-off of an SCR by the application of reverse current is defined as commutation. Several types of commutation circuits have been developed for this purpose, and examples of known arrangements can be found in Section 5.4, pages 91–95 of the *General Electric SCR Manual,* fourth Edition, published by the Semiconductor Products Department of General Electric Company, dated 1967.

In current pulse generator circuits, the capacitor is typically recharged following each pulse prior to the subsequent pulse. When the capacitor discharges into an inductive load such as a transformer primary winding, efficient operation can be achieved by permitting a reverse current to flow following discharge of the capacitor from the load into the capacitor for partial recharge of the capacitor. For example, U.S. Pat. No. 3,425,780 issued on Feb. 4, 1969 to W. F. Potts discloses a circuit wherein a rectifier oppositely poled to the SCR is provided for the flow of reverse current.

A primary object of the present invention is to provide a current pulse generator circuit including a commutation circuit performing the dual functions of applying a large reverse voltage and current peak to the SCR for achieving a reduction in turn-off time and of permitting substantial reverse current flow for efficient recharge of the capacitor.

Briefly, a current pulse generator circuit constructed in accordance with the invention may comprise a capacitor adapted to be charged from a power source, a transformer having a primary winding, and an SCR. The capacitor, primary winding and SCR output electrodes are in a circuit loop, and a gating circuit periodically renders the SCR conductive to discharge the capacitor through the primary winding. A commutation circuit comprises a circuit branch connected across the SCR output terminals and includes a diode oppositely poled relative to the SCR for permitting reverse current to flow from the primary winding to the capacitor. An inductance in series with the diode initially applies a large reverse voltage peak to the SCR resulting in a reverse current peak for reduction in the SCR turn-off time. Thereafter the inductance permits the flow of substantial reverse current for efficient recharge of the capacitor.

Figure 2:
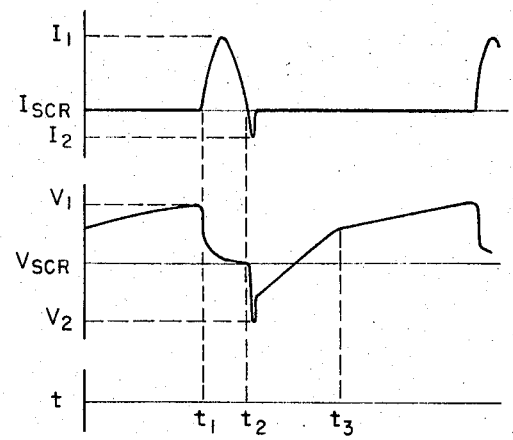

The invention together with the above and other objects and advantages may be better understood with reference to the following detailed description of an embodiment of the invention illustrated in the accompanying drawing wherein:

FIG. 1 is a schematic diagram of a spark ignition system including a current pulse generator circuit embodying the features of the present invention; and FIG. 2 is a graphical illustration of the voltage and current waveforms associated with the SCR of the circuit of FIG. 1.

Having reference now to the drawing, in FIG. 1 there is illustrated a spark ignition system generally designated as 10 incorporating a current pulse generator circuit designated as a whole as 12 and constructed in accordance with the principles of the present invention. In general, the generator circuit 12 includes a transformer 14 having a primary winding 16, a capacitor 18, and an SCR 20 controlling the discharge of the capacitor 18 through the winding 16. In accordance with an important feature of the invention, there is provided a commutation circuit generally designated as 22 for decreasing the turn-off time of the SCR 20 and for permitting efficient recharging of the capacitor 18.

Although the current pulse generator circuit 12 of the present invention is shown in conjunction with the spark ignition system 10, it should be understood that the principles of the invention may be applied to other uses including but not limited to high voltage DC power supplies and the like. With reference more particularly to the system 10, there are provided a pair of terminals 24 and 26 for connection to a standard sixty cycle nominal 120 volt power supply. Terminals 24 and 26 are coupled to the generator circuit 12 by power supply section 28 including a load resistor 30 and inductance 32 serving to limit current flow to the generator circuit 12. A diode 34 is provided to prevent the flow of current through the generator circuit 12 during half cycles of the supply voltage when terminal 26 is positive relative to terminal 24.

A series of current pulses are caused to flow through the primary winding 16 of transformer 18 by operation of the generator circuit 12 in the manner described below. Transformer 14 includes a secondary winding 36 coupled to a pair of spark electrodes 38 and 40 located in known manner in ignition relation to an oil burner as described, for example, in above-mentioned U.S. Pat. No. 3,556,706. Current pulses in winding 16 cause ignition sparks to be created in the gap between spark electrodes 38 and 40.

Proceeding now to a description of the current pulse generator circuit 12, this circuit includes a pair of power supply terminals 42 and 44. During half cycles of the AC supply voltage when terminal 24 of the ignition system 10 is positive with respect to terminal 26, a positive voltage is applied to power supply terminal 42 relative to terminal 44 by the power supply section 28 and the generator circuit 12 operates. It is to be understood that terminals 42 and 44 may be coupled to a source of DC voltage if continuous operation is desired. During operation of the generator circuit 12, capacitor 18 becomes charged in a first polarity wherein the side of the capacitor connected to terminal 42 is positive relative to the side of the capacitor connected to terminal 44.

In order to control the discharge of the capacitor 18, there is provided a gating circuit generally designated as 46 connected to the control electrode or gate electrode of the SCR 20. The gating circuit 46 normally maintains the SCR 20 in a nonconductive condition, and operates in response to a predetermined charge level of capacitor 18 to render the SCR 20 conductive. The gating circuit 46 includes a variable resistor 48, the setting of which determines the firing point of the SCR 20. A resistor 50 provides stabilizing gate bias on the SCR for preventing spurious firing due to internally generated leakage currents and a capacitor 52 provides a slight delay phase shift. It is not necessary to use a gating circuit dependent upon capacitor charge level, and if desired other known SCR gating circuits could be used. One alternative is an oscillatorcontrolled gating circuit operating at a frequency independent of the voltage level across capacitor 18.

In operation of the generator circuit 12, when the SCR 20 is rendered conductive, the capacitor 18 is discharged abruptly through the circuit loop including the SCR 20 and the primary transformer winding 16. As SCR 20 becomes conductive, the gating voltage applied by gating circuit 46 to the SCR 20 drops to condition the SCR for turn-off in the manner described below. Winding 16 functions as an inductive load, and forward current continues to flow through the SCR 20 until the capacitor 18 becomes discharged and then becomes charged in the opposite polarity. At this point a reverse voltage across the winding 16 tends to cause current to flow in the reverse direction. In accordance with the invention, the commutation circuit 22 is provided to utilize this reverse current flow for turn-off of the SCR 20 and for recharge of the capacitor 18.

More specifically, in accordance with the invention the commutation circuit 22 includes a diode rectifier 54 and an inductance 56 connected in series with one another in a circuit branch connected across the output electrodes of the SCR 20. Diode 54 is oppositely poled with respect to SCR 20 so that circuit 22 is nonconductive to forward current. Diode 54, however, does permit reverse current to flow after full discharge of the capacitor 18.

When reverse current begins to flow, inductance 56 initially presents a substantial impediment to current flow. Thus a substantial voltage drop exists briefly across the inductance 56 and therefore across the commutation circuit 22. This voltage drop is applied as a reverse voltage peak across the output terminals of the SCR 20. The reverse voltage peak results in a reverse current peak through the SCR 20. As a consequence the turn-off time of the SCR 20 is reliably and substantially reduced.

As reverse current continues to flow, the inductance 56 decreases in effective impedance. Substantial reverse current is therefore able to flow through the commutation circuit 22 resulting in a substantial increase in the charge rate of the capacitor 18. Since capacitor 18 is not required to be recharged entirely from the power supply, the time required for recharging is decreased and the efficiency of the circuit is increased.

Having reference now to FIG. 2, waveforms of voltage across and current through the SCR 20 of a circuit constructed in accordance with the invention are graphically represented. Prior to time $t_1$ the SCR is in the nonconductive condition and no current is flowing through the SCR. As the capacitor 18 is charging, the voltage across the SCR 20 is increasing.

At time $t_1$ the voltage across capacitor 18 reaches a maximum level $V_1$ and the SCR 20 is placed in a conductive condition. Between times $t_1$ and $t_2$ a pulse of forward current having a maximum value $I_1$ flows through the SCR. At time $t_2$ the forward current falls to zero, and reverse current begins to flow. Due to the operation of the commutation circuit 22, a reverse current having a peak value of $I_2$ flows through the SCR to reduce the turn-off time. An accompanying reverse voltage having a peak value of $V_2$ also occurs.

The commutation circuit 22 continues to conduct reverse from time $t_2$ until time $t_3$. As can be seen from the slope of the voltage waveform in this interval, this reverse current substantially assists in the recharge of capacitor 18.

In a circuit constructed in accordance with the present invention, the circuit components and voltage and current figures had the approximate value set forth in the following table. It was found that discrete pulses could be produced at a rate of 20,000 per second without the use of an expensive SCR. It should be understood that the values given below are illustrative of one specific embodiment of the invention only and are not intended to limit the invention.

| | |
|---|---|
| Resistance 30 | 5 ohms |
| Resistance 48 | Variable, 30,000 ohms – 280,000 ohms |
| Resistance 50 | 510 ohms |
| Capacitor 18 | .68 microfarads |
| Capacitor 52 | .068 microfarads |
| SCR 20 | C106B11 (General Electric) |
| Inductance 32 | 326 millihenrys |
| Inductance 56 | 88 microhenrys |
| Transformer 14 | |
|     winding 16 | 45.5 microhenrys |
| | (25 turns, No. 24 wire) |
|     winding 36 | 116 millihenrys |
| | (1450 turns, No. 38 wire) |
| Voltage $V_1$ | 220 volts |
| Voltage $V_2$ | –220 volts |
| Current $I_1$ | 80 amps |
| Current $I_2$ | –20 amps |
| Reverse current through circuit 22 | 40 amps, peak |

While the invention has been described with reference to details of the illustrated embodiment, such details do not limit the invention as set forth in the following claims.

What is claimed and desired to be secured by Letters Patent of the United States is:

1. A current pulse generator circuit comprising:
   a pair of power supply terminals adapted to be connected to a power source;
   a capacitor;
   circuit means including said power supply terminals and said capacitor for charging said capacitor;
   a transformer having a primary winding;
   an SCR having a pair of output electrodes and a control electrode;
   a circuit loop including said capacitor, said primary winding and said SCR output terminals;
   gating means connected to said SCR control electrode for periodically rendering said SCR conductive to discharge said capacitor through said primary winding; and
   commutation means for reducing the turn-off time of the SCR following said capacitor discharge;
   said commutation means including a circuit branch connected across the SCR output electrodes;
   said circuit branch including rectifying means oppositely poled relative to said SCR output terminals for permitting reverse current to flow through said branch between said primary winding and said capacitor following discharge of the capacitor;
   said circuit branch further including variable effective impedance means in series with said rectifying means for imposing an initially high reverse voltage on the SCR and for thereafter permitting substantial reverse current flow for recharge of the capacitor.

2. The generator circuit of claim 1, said rectifying means comprising a diode rectifier.

3. For use in a circuit of the type including an SCR for periodically discharging a capacitor in a current pulse into an inductive load, a commutation circuit for turn-off of the SCR comprising:
   a circuit branch connected across the SCR output terminals;
   a diode rectifier in said circuit branch oppositely poled with respect to said SCR for permitting reverse current flow from said load to said capacitor through said branch following discharge of the capacitor; and
   variable effective impedance means in said circuit branch in series with said diode rectifier for imposing an initially high reverse voltage on the SCR and for thereafter permitting substantial reverse current flow for recharge of the capacitor.

4. The circuit of claim 3, said variable effective impedance means comprising an inductance.

5. The circuit of claim 1, said variable effective impedance means comprising an inductance.

* * * * *